(12) United States Patent
Logsdon

(10) Patent No.: US 7,394,205 B2
(45) Date of Patent: Jul. 1, 2008

(54) POWER SUPPLY SYSTEM METHOD OF USE

(75) Inventor: Timothy D. Logsdon, Livermore, CA (US)

(73) Assignee: Continuum Electro-Optics, Inc., Santa Clara, CA (US)

( * ) Notice: Subject to any disclaimer, the term of this patent is extended or adjusted under 35 U.S.C. 154(b) by 105 days.

(21) Appl. No.: 11/134,611

(22) Filed: May 20, 2005

(65) Prior Publication Data

US 2005/0253563 A1    Nov. 17, 2005

Related U.S. Application Data

(63) Continuation-in-part of application No. 11/053,194, filed on Feb. 7, 2005, now Pat. No. 7,276,857, which is a continuation-in-part of application No. 11/053,195, filed on Feb. 7, 2005.

(60) Provisional application No. 60/569,207, filed on May 6, 2004.

(51) Int. Cl.
   *H05B 37/00* (2006.01)
(52) U.S. Cl. .................................. 315/200 A
(58) Field of Classification Search ............. 330/2, 330/10, 251, 282, 291; 315/137, 141, 142, 315/149, 50, 56, 58, 70–71, 150, 200 A
See application file for complete search history.

(56) References Cited

U.S. PATENT DOCUMENTS

| 5,416,387 | A | 5/1995 | Cuk et al. .................... 315/209 |
| 5,650,694 | A | 7/1997 | Jayaraman et al. ........... 315/225 |
| 6,373,340 | B1 * | 4/2002 | Shashoua .................... 330/297 |
| 6,426,505 | B1 | 7/2002 | Rao et al. ................ 250/458.1 |
| 6,744,644 | B2 * | 6/2004 | Kojori .......................... 363/49 |
| 6,757,084 | B2 | 6/2004 | Kurita et al. ................ 358/509 |
| 6,775,117 | B2 * | 8/2004 | Wodrich et al. ............... 361/56 |
| 6,791,273 | B2 | 9/2004 | Ito et al. ....................... 315/82 |
| 6,812,591 | B2 * | 11/2004 | Umemura et al. ............. 307/66 |
| 7,038,390 | B2 * | 5/2006 | Swami et al. ............... 315/112 |
| 2005/0017751 | A1 * | 1/2005 | Gunn et al. .................. 324/771 |

OTHER PUBLICATIONS

Michael T. Zhang, et al., "Analysis and Evaluation of Interleaving Techniques in Forward Converters", IEEE Transactions on Power Electronics, vol. 13, No. 4, Jul. 1998.

Christopher Bridge, "The Implication of Synchronous Rectifiers to the Design of Isolated, Single-ended Forward Converters", Texas Instruments Incorporated 2002.

* cited by examiner

*Primary Examiner*—Tuyet Vo
*Assistant Examiner*—Minh Dieu A
(74) *Attorney, Agent, or Firm*—Paul Davis; Goodwin Procter LLP

(57) ABSTRACT

A power supply system is provided that includes a power supply and at least one energy storage capacitor bank. A voltage monitor is coupled to the power supply and the energy storage capacitor bank. A feedback control is coupled to the power supply. The feedback control is configured to provide that a current applied to the energy storage capacitor bank is substantially the same as current leaking out of the power supply.

47 Claims, 15 Drawing Sheets

SIMPLIFIED INVERTER SECTION SCHEMATIC

PARALLEL DRIVE CONFIGURATION

POWER SUPPLY SYSTEM METHOD OF USE

CROSS-REFERENCE TO RELATED APPLICATION

The present application is a continuation in part of U.S. Ser. No. 11/053,194 filed Feb. 7, 2005 U.S. Pat. No. 7,276,857, and is a continuation-in-part of U.S. Ser. No. 11/053,195, filed Feb. 7, 2005, both of which applications claim the benefit of priority from commonly assigned co-pending U.S. Provisional Application Ser. No. 60/569,207 filed May 6, 2004. All of the above-identified applications are fully incorporated herein by reference for all purposes.

BACKGROUND OF THE INVENTION

1. Technical Field

The present invention relates generally to power supply systems, and more particularly to power supply systems that charge one or more energy storage capacitor banks, and provide that a current applied is substantially the same as current leaking out of the power supply.

2. Background Art

Power supplies and amplifiers are well known in the art. A variety of configurations and topologies have been developed over the years to provide electrical power to a load. Loads that have widely varying impedances, however, provide a challenge to traditional power supplies driven by conventional techniques. One particular challenge involves finding a power supply or amplifier capable of supplying a variety of waveforms to drive a dynamic, widely varying load such as a flash lamp.

Flash lamps are of particular interest because of the difficulty of driving a flash lamp is the very dynamic nature of the load. When a flash lamp varies impedance to a point where the impedance is lower than the output impedance of the flash lamp, more energy is dissipated in the amplifier than in the load. This may end up (in other topologies) heating up of switches and the energy is dissipated as heat. For example, as current is sourced through the lamp, the impedance of the lamp changes in a negative way. With a fixed impedance load, as current is increased, the voltage drop across the fixed load proportionally increases also. With a flash lamp, this does not occur because the lamp becomes more conductive as more current is sourced into it. The voltage drop stays the same or it may go down (this is known as negative impedance). For most amplifiers, this has an appearance of a dead short occurring on the output. It appears as a varying load that is approaching a dead short at a very critical time. These qualities of a flash lamp make them particularly difficult to drive. Additionally, some known power supplies heat the flash lamps too quickly which may result in premature failure of the lamps.

Power supplies and amplifiers that can provide pulse width modulation output (PWM) are of particular interest. Some known configurations or topologies that can provide a PWM output to control power include push pull, bridge inverter, and flyback topologies. Known amplifiers with these topologies may provide rectangular pulses delivered to a transformer at a regular period. However, these known power supplies use rectangular pulses delivered to a transformer at a regular period and throttle the duty cycle forwards or backwards (greater or less) depending on the current need of the load. Most switching power supplies that are in many common place items are driven to operate in this manner.

Traditional resonant power supplies cannot provide variable energy per pulse. Rather the energy per pulse is fixed requiring fewer pulses per unit time be delivered to reduce output energy and more pulses per unit time to increase energy. This method in effect removes pulses which will cause the flash lamp to extinguish at low energy levels. Traditional PWM controlled power supplies use switch on time duty cycle to control energy and thus offer limited control range.

There is a need for a power system where an energy storage capacitor bank is charged, and then the amount of current applied to the energy storage capacitor is substantially the same as current leaking out of the power supply. There is a further need for a power system where output of the power supply is rectified and used to charge the energy storage capacitor bank. There is a further need for a low repetition rate power system where an energy storage capacitor bank is charged, and then the amount of current applied to the energy storage capacitor is substantially the same as current leaking out of the power supply.

SUMMARY OF THE INVENTION

Accordingly, an object of the present invention is to provide a power system, where an energy storage capacitor bank is charged, and then the amount of current applied to the energy storage capacitor is substantially the same as current leaking out of the power supply.

Another object of the present invention is to provide a low repetition rate power system, where an energy storage capacitor bank is charged, and then the amount of current applied to the energy storage capacitor is substantially the same as current leaking out of the power supply.

A further object of the present invention is to provide a power system where output of the power supply is rectified and used to charge an energy storage capacitor bank.

Another object of the present invention is to provide a power system with an amplifier that is able to withstand the appearance of a dead short occurring on the output amplifier.

A still further object of the present invention is to provide a power system with an amplifier which provides switching power supplies that can withstand a load having positive and negative impedance.

Another object of the present invention is to be able to provide a power system with an amplifier that can synthesize a variety of waveforms and pulses.

Yet another object of the present invention is to provide a power system with an amplifier that is scalable and modular.

A still further object of the present invention is to provide a power system with an amplifier that can be scalable, and being like batteries, can be connected in series, parallel, and series parallel.

Another object of the present invention is to provide a power system with high frequency PWM that goes directly to a lamp or other load and uses the duty cycle of the PWM to control the power delivered to the load.

Another object of the present invention is to provide a power system that can create a high frequency pulsed energy output directly to a lamp or other load and modulate the frequency or period to control power delivery to the load.

These and other objects of the present invention are achieved in a power supply system that includes a power supply. At least one energy storage capacitor bank is provided. A voltage monitor is coupled to the power supply and the energy storage capacitor bank. A feedback control is coupled to the power supply. The feedback control is configured to provide that a current applied to the energy storage capacitor bank is substantially the same as current leaking out of the power supply.

In another embodiment of the present invention, a power supply system is provided that has a power supply and at least one energy storage capacitor bank. A voltage monitor is coupled to the power supply and the energy storage capacitor bank. A feedback control is coupled to the power supply. The feedback control is configured to provide that a current applied to the at least one energy storage capacitor bank is substantially the same as current leaking out of the power supply. A dynamic load has a dynamic load impedance. An amplifier has a topology configured to provide a PWM power output to the dynamic load. The amplifier has an output impedance that is less than the impedance of the load when the load is in a confined discharge mode.

In another embodiment of the present invention, a power supply system is provided and includes a power supply and at least one energy storage capacitor bank. A voltage monitor is coupled to the power supply and the energy storage capacitor bank. A feedback control is coupled to the power supply. The feedback control is configured to provide that a current applied to the energy storage capacitor bank is substantially the same as current leaking out of the power supply. A dynamic load has a dynamic load impedance. An amplifier has a topology configured to provide a PWM power output to the dynamic load. The amplifier has an output impedance that is less than the impedance of the load when the load is in a confined discharge mode. A flash lamp is provided that has a flash lamp impedance and an arc persistence time when the flash lamp is lit. The amplifier has a topology for providing PWM power output directly to the flash lamp. An amplifier driver is configured to drive the amplifier. The amplifier driver has a fixed or variable frequency control that provides the PWM power output at a frequency such that the period of the power output does not exceed the persistence time of a flash lamp during energy delivery.

DESCRIPTION OF THE SPECIFIC EMBODIMENTS

It is to be understood that both the foregoing general description and the following detailed description are exemplary and explanatory only and are not restrictive of the invention, as claimed. It may be noted that, as used in the specification and the appended claims, the singular forms "a", "an" and "the" include plural referents unless the context clearly dictates otherwise. Thus, for example, reference to "a material" may include mixtures of materials, reference to "a resistor" may include multiple resistors, and the like. References cited herein are hereby incorporated by reference in their entirety, except to the extent that they conflict with teachings explicitly set forth in this specification.

In this specification and in the claims which follow, reference will be made to a number of terms which shall be defined to have the following meanings:

"Optional" or "optionally" means that the subsequently described circumstance may or may not occur, so that the description includes instances where the circumstance occurs and instances where it does not. For example, if a device optionally contains a feature for using a filtering device, this means that the filter feature may or may not be present, and, thus, the description includes structures wherein a device possesses the filtering feature and structures wherein the filtering feature is not present.

Figure 1A:
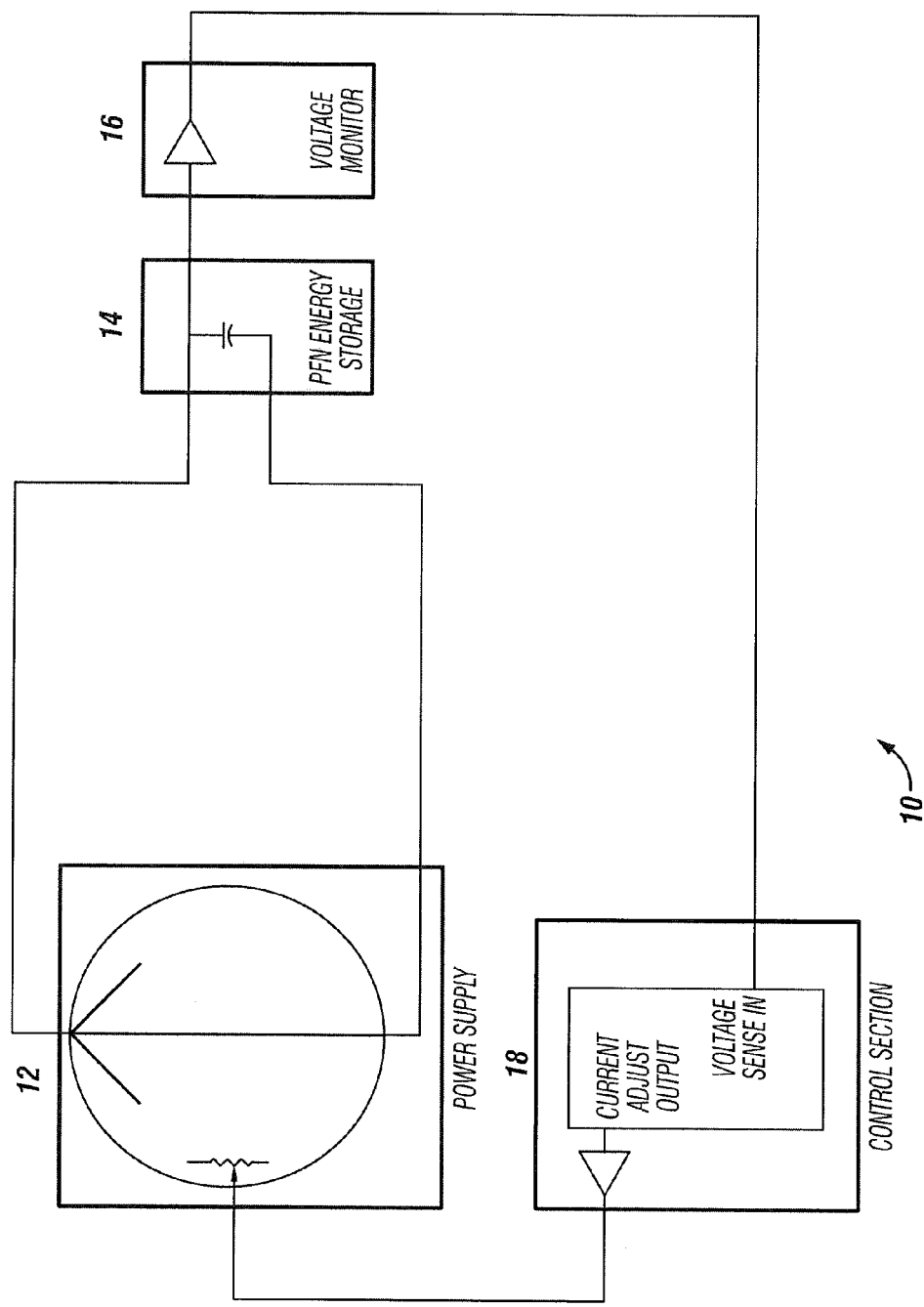
FIG. 1(a) is a schematic diagram illustrating one embodiment of a power supply system of the present invention.
Figure 1B:
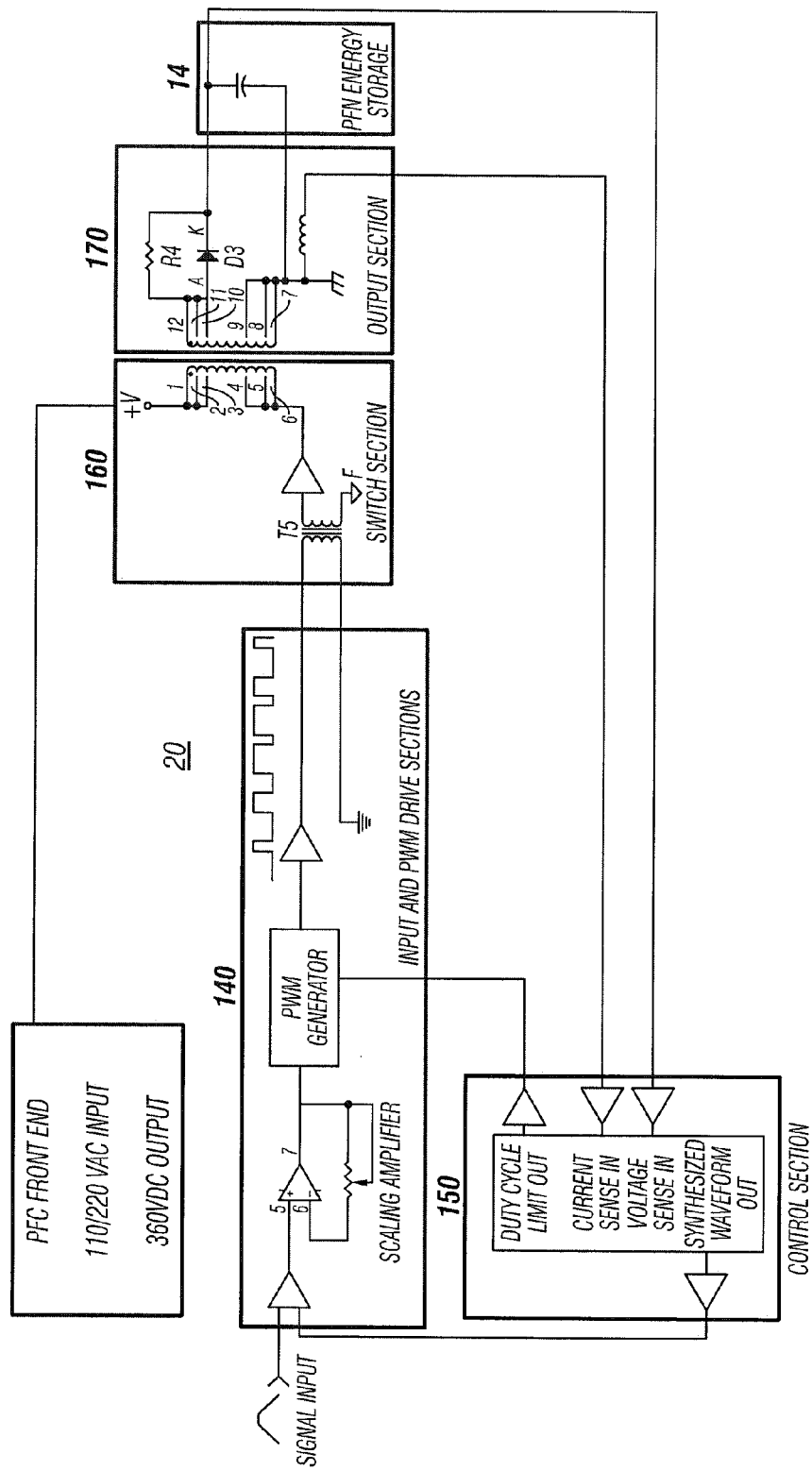
FIG. 1(b) is a schematic diagram showing various modules for one embodiment of an amplifier that can be utilized with the FIG. 1(a) power supply system.

Referring to FIGS. 1(a) and 1(b), one embodiment of the present invention is a power supply system 10 that includes a power supply 12. At least one energy storage capacitor bank 14 is provided. It will be appreciated that a plurality of energy storage capacitor banks 14 can be utilized. A voltage monitor 16 is coupled to the power supply 12 and the energy storage capacitor bank 14.

A feedback control 18 includes control logic. In the case of a load, the feedback control 18 measures and controls and amount of energy delivered to the load. In this embodiment, the feedback control 18 measures the amount of energy that is delivered to a pulse forming network. The feedback control 18 then goes into a high resolution mode where it maintains the amount of energy stored in the pulse forming network. This compensates for internal losses within the pulse forming network that occur through component imperfections. The high resolution mode means that it can measure much smaller changes in the energy storage level. A precision control device is included in the feedback control, as more further shown in FIG. 1(b). This is an additional input into block 50. It measures load voltage. is coupled to the feedback control 18 and the power supply 12. The feedback control 18 is configured to provide that a current applied to the energy storage capacitor bank 14 is substantially the same as current leaking out of the power supply 12. In one embodiment, power supply system 10 is coupled to an amplifier 20.

Figure 2:
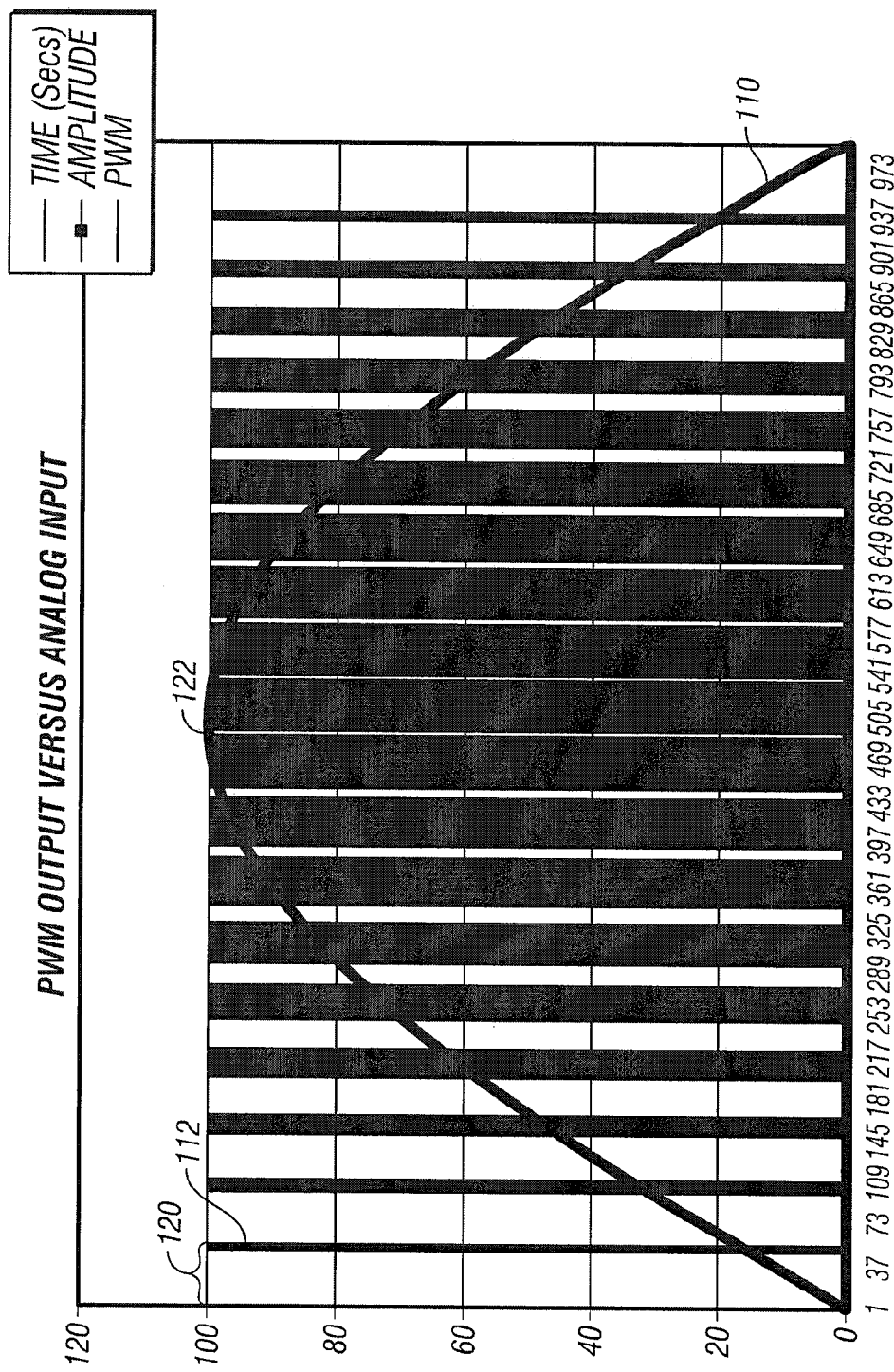
FIG. 2 is a graph of a PWM output to a load versus the analog input signal.

As illustrated in FIG. 1(b), one method of using amplifier 20 is to provide energy to a dynamic, non-linear load such as any pulsed discharge system, including but not limited to electro-optics devices, lasers, flash lamps, welding equipment, medical equipment such as defibrillators, and the like. As seen in FIG. 2, the amplifier 20 can use PWM to control the amount of power delivered to the load over time.

In one specific embodiment of the present invention, a lamp 22, which again is a particular type of load, is provided that filters the pulsed nature of an output of the amplifier 20, and produces light output, which is proportional to the PWM duty cycle. The power output of the lamp 26 is shown by curve 110 in FIG. 2(b). The output from the amplifier 20 to the lamp 26 is shown as a plurality of pulses 112.

In one embodiment, the train of pulses 112 are at a fixed period 120 but variable duty cycle (ON-to-OFF state ratio) is delivered to the load 22. In other words, as seen in FIG. 2(b), the amount of time in each period 120 is fixed, but the amount of time that power (i.e. pulses 112) is delivered during each period 120 is variable. As the duty cycle ON time is increased, the power delivered to the load 22 increases. In FIG. 2, this is indicated by the "wider" pulse 122 and the increased amplitude of line 110. It should be understood that the amplifier 20 varies the duty cycle in response to an analog signal presented to the input and thus functions as an amplifier. For example, to provide a sinusoidal power waveform, the width of the pulses are varied. The pulses 122 are the actual energy being delivered to the lamp. In this embodiment, the period 120 is constant. Width of pulse 122 is the amount of time the switches are ON which determines the amount of power (energy/seconds) delivered to the lamp during the given pulse. In FIG. 2, the pulse ON times (widths) are increased at a sinusoidal rate and thus the power envelope delivered to the lamp is sinusoidal as indicated by line 110.

For a flash lamp driven by the amplifier 20 according to the present invention, the period 120 is determined in part by the persistence time of the lamp 22. The persistence time is the length of time that the streamer in the lamp remains intact. In other words, it is the amount of time it takes for the gas in the lamp 22 to recombine, ionization to cease, and the streamer to decay and extinguish. Knowing that time allows us to know what the maximum period (i.e. lowest PWM frequency) could be. The period, along with the lamp persistence time also determines the amount of ripple in the light output from the lamp. Just as the lamp integrates the pulse train of the PWM into a smooth curve with some ripple, the laser rod integrates the optical ripple. For the present invention used to drive a flash lamp load 22, the length of each PWM period 120 should not exceed the persistence time of the flash lamp or else the lamp will need to be re-lit (i.e. charging the gas until the streamer reforms). Reducing the frequency (increasing period between pulses) will cause the streamer to extinguish.

In one embodiment, the period 120 may be about 1/10 the persistence time of the lamp, to minimize ripples in the optical output of the lamp. It should be understood that other time periods may also be selected, such as but not limited to 20% of the persistence time. Shorter time periods may be used without loss of the lamp streamer. Longer time periods (up to 100% of the persistence time) will introduce more ripple in the optical output of the lamp. It should be understood of course, that in some embodiments, the period is not fixed and may be of variable length, preferably not exceeding the arc persistence time when used to drive a lamp.

Referring again to FIG. 1(b), one embodiment of amplifier 20 according to the present invention will now be described. FIG. 2 shows that this embodiment of the amplifier 20 may have four basic circuit elements: an input section 140, a control section 150, a switch section 160, and an output section 170. In this embodiment, the switch section 160 receives DC power from a power factor corrected (PFC) front end 162. The input section 140 provides signal amplification and scaling of the input signal and generates a proportional pulse width modulated (PWM) output. In this embodiment, the control section 150 manages the output energy from the output section 170 by regulating the ON time of the PWM generated in the input section 140. The ON time of the switch section 160 will determine the amount of energy delivered to the load 22 during each PWM period from the output section 170. The control section 150 also manages the overall pulse width and pulse repetition rate by gating bursts of the smaller PWM pulses.

In another embodiment of the present invention, power supply system 10 includes a load 22 that has a dynamic load impedance. In one embodiment, amplifier 20 is provided has a topology configured to provide a PWM power output to the load 22. The amplifier 20 has an output impedance that is less than the impedance of the load 22 when the load 22 is in a confined discharge mode.

Figure 3:
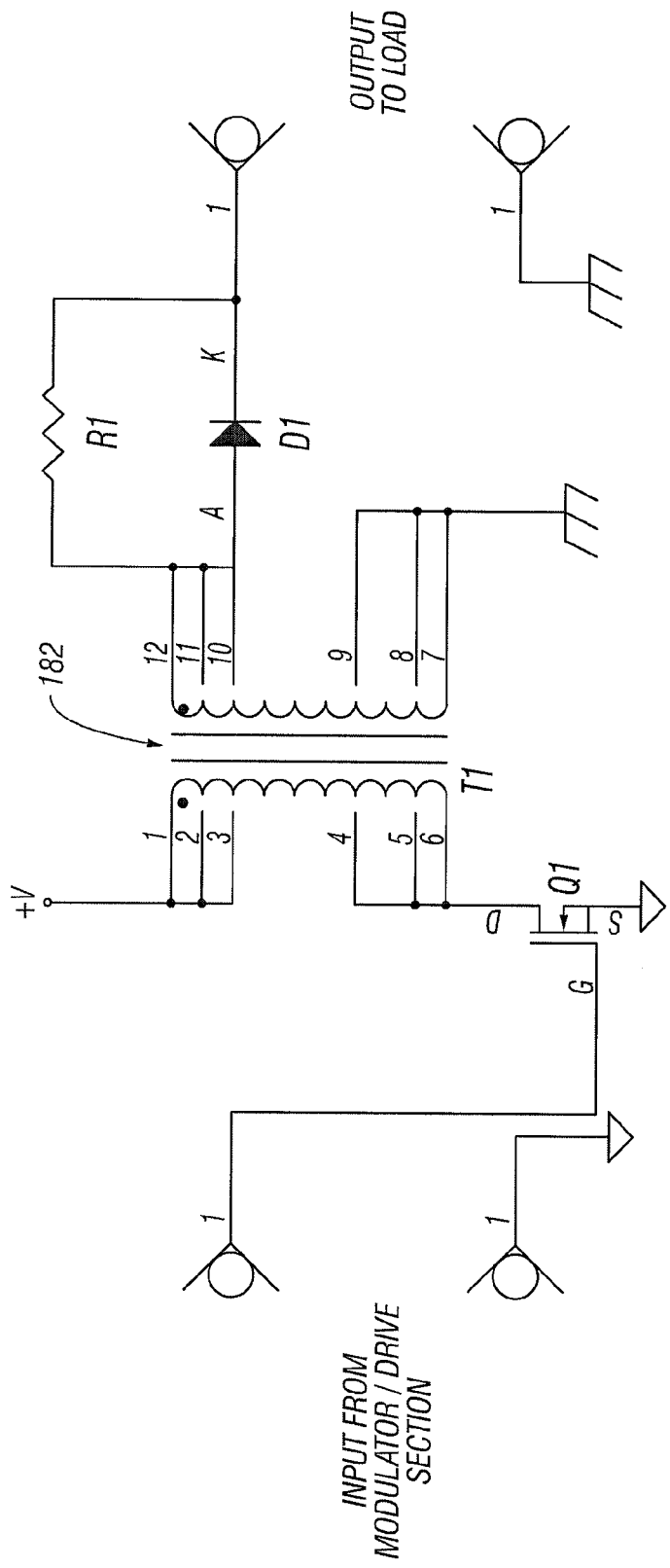
FIG. 3 shows a schematic of one embodiment of an inverter section according to the present invention.

Referring now to FIG. 3, the inverter portion of the present invention will be described in further detail. The inverter provides the switching and energy transfer elements controlled by control section 150. FIG. 3 shows that in this embodiment, the inverter section comprises a resonant reset, forward converter topology. This topology provides the benefits of typical non-resonant topologies such as PWM control, reasonable load/line variation tolerance and zero current on time switching. However, like a resonant topology, this design uses self-resonance to reset the core of transformer 182, which results in efficient off time switching. FIG. 3 shows a simplified schematic depicting the switch section 160 and output section 170 (the sections are denoted by broken lines) in the inverter section. The present topology includes at least one MOSFET switch 180 in switch section 160 and a forward inverter transformer 182 in the output section 170 that is used to transfer energy to the load 22.

As seen in the embodiment of FIG. 3, when the MOSFET switch 180 is driven high to a voltage above threshold, the switch 180 saturates and provides conduction from the drain to source. Current then flows through the MOSFET switch 180 and the primary of the transformer 182 inducing load current in the output section 170 to the load 22. As seen in the waveforms presented in FIG. 4(a), load current flows while the MOSFET switch is ON (saturated). The energy delivered to the load 22 is controlled by the on time duration of the MOSFET gate drive signal. FIG. 4(b) shows load current for a gate drive duration of 2.4 μS and FIG. 4(c) shows load current for a gate drive duration of 5 μS.

Once the MOSFET drive signal is turned off, the core of transformer 182 is reset by returning the magnetizing current to the front end reservoir section through the resonant circuit consisting of the MOSFET Miller capacitance, the transformer primary inductance, and the transformer inter-winding capacitance. During this reset period there is no current flow in the MOSFET switch. This zero current switching enhances the overall electrical efficiency of the amplifier 20. This minimizes the amount of energy that is dissipated by the amplifier 20 or returned to the reservoir. During this time, the output of the amplifier 20 is electrically isolated from the load 22. The diode D1 is used in this embodiment to enable the electrical isolation.

Figure 5:
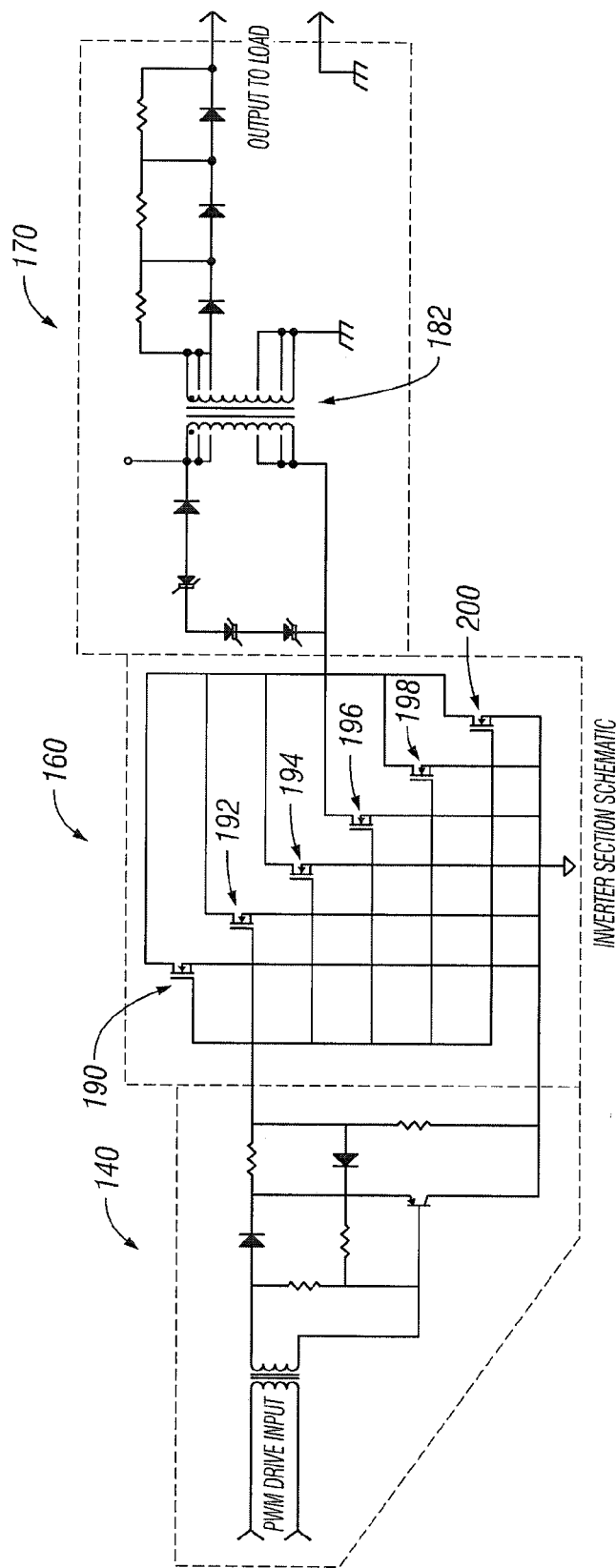
FIG. 5 shows a schematic for one embodiment of an amplifier according to the present invention.

The quantity of energy delivered to the load 22 is proportional to the length of time that the switch 180 remains ON. The control logic in the control section 150 manages the output energy of the amplifier 20 by varying the ON time of switch 180. The maximum switch ON time limit occurs when the core of transformer 182*82 saturates and that is a function of the transformer design. If the ON time reaches this limit, the switch current will exceed the capability of the MOSFET and the device will be destroyed. The ON time limit in the embodiment of FIG. 5 is 5 μS. Once the desired amount of energy is delivered, the gate of switch 180 is driven low to about 0 volts at which time the transformer core is reset.

Figure 4A:
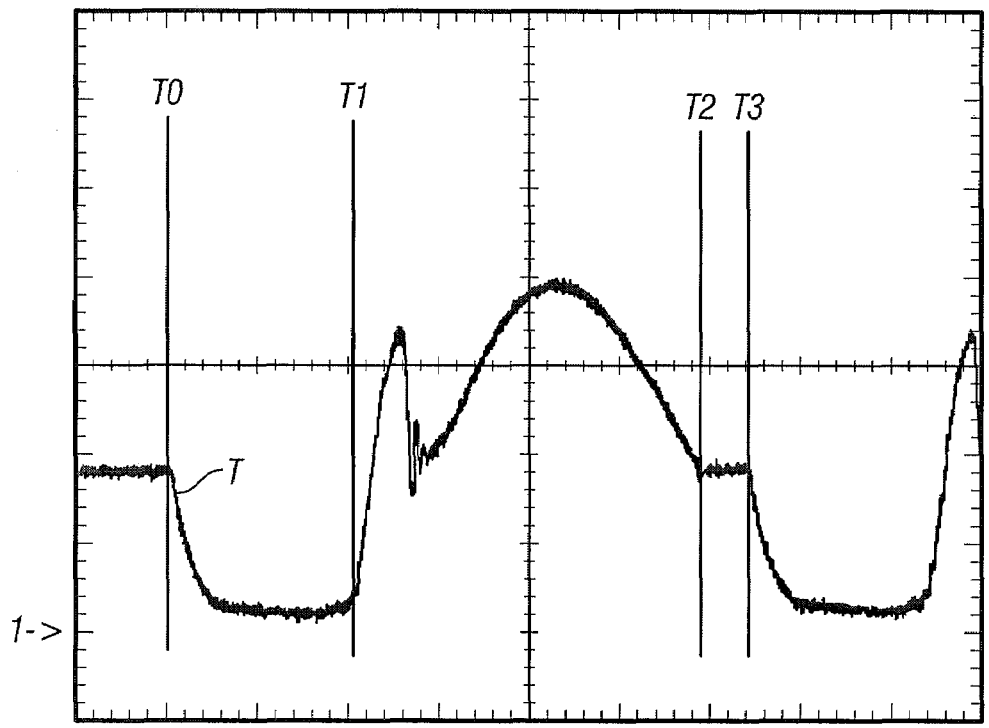
FIG. 4(a) is a graph of drain voltage for a switch used in one embodiment of the present invention.
Figure 4B:
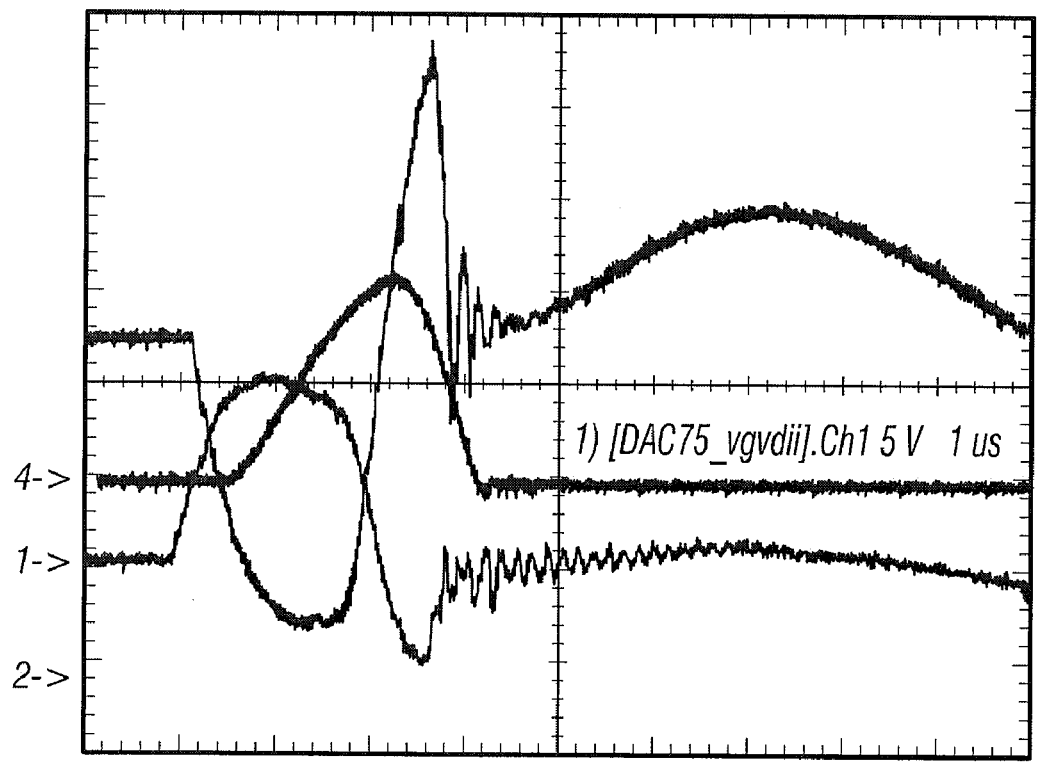
FIGS. 4(b) and 4(c) are graphs of multiple variables such as load current, drain voltage, and gate drive for a switch used in one embodiment of the present invention.
Figure 4C:
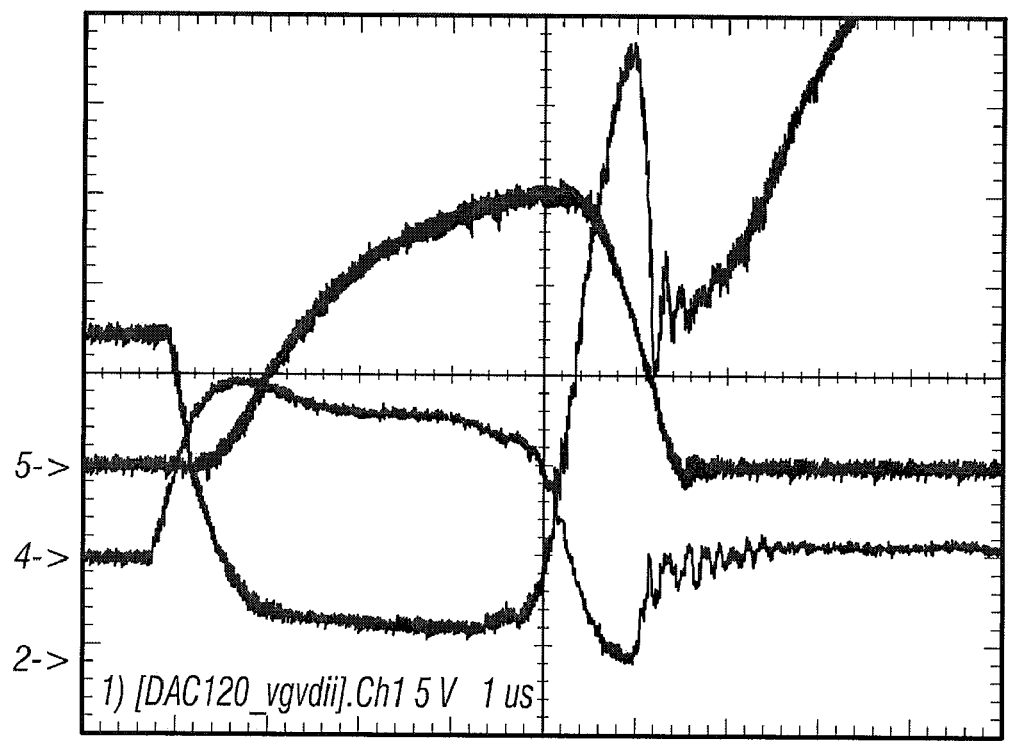

FIG. 4(a) shows an oscilloscope image of the switch 180*80 drain voltage during switching at maximum duty cycle. To achieve the desired output, the present invention balances between all of the active components, working with the MOSFETS and their miller capacitance and the inductance available in a given size core in a transformer 182. Then, it is desirable to try to match that on the output side to a flash lamp. The switch section 160 and output section 170 should be compatible with the dynamic impedance of the flash lamp.

It should also be understood, however, that the maximum ON time (energy) for switch 180 is limited in part by the magnetic flux density of the transformer 182. For one embodiment of the present invention, that time is on the order of about 5 microseconds. As long as the ON time of the switch 180 stays under that range, the transformer 182 will not saturate. The magnetic flux density of the transformer 182 is determined in part by design, geometry, and material selection of the components used in the construction of the transformer 182. Specifically, when the switch or switches 180 turn on, the transformer 182 transfers energy to the load 22. When the switch 180 is turned off, the field collapses and the magnetizing energy is returned to the front end reservoir section as the transformer core resets. FIG. 4(a) shows the MOSFET switch drain voltage during a single cycle of operation. The switch is turned on at T0. The drain switches to 0V conducting current through the primary of the transformer. It is at this time that current flow is induced in the transformer secondary and power is delivered to the load. At T1 the MOSFET switch is turned off. In the period from T1 to T2 the resultant resonant circuit voltage resets the transformer core. The resonant circuit determines the reset time and consists of circuit reactances including the Miller capacitance of switch 180, the inter-winding capacitance of the transformer 182, and the primary inductance of the transformer 182. The period of this reset time is approximately equal to: $\pi\sqrt{(L_p \cdot C_{Q1})}$ Where $L_p$ is the transformer primary inductance and $C_{Q1}$ is the circuit capacitance.

In one embodiment, the switch not be active during this reset period such that the next pulse does not occur until the resonant reset of the core of transformer 182 is complete. Therefore the reset time is a factor in the maximum pulse frequency delivered to the lamp. The number of MOSFETS used in a given switch section determines the output impedance of the amplifier 20 (more MOSFETS equals lower output impedance). However, an increase in the number of MOSFETS causes an increase in the reset time thus limiting the operating frequency (lengthening the PWM period). Since the most efficient transfer of energy to the lamp occurs when the amplifier 20 and lamp impedances are matched, the number of MOSFET switches used is important. The switch section impedance is determined by the transformer design, the MOSFET switch characteristics and the number of MOSFET switches used. The amplifier 20 output impedance is also a function of the number of amplifier 20 modules used and the connection configuration of these modules (series, parallel, or combination). There is a series of design tradeoffs between the lamp design, transformer design, MOSFET switch characteristics, and module configuration all of which must be balanced.

In a typical resonant switching amplifier, the energy per pulse is fixed and is determined by the resonance of the switch capacitance, transformer reactances, and reflected reactance from the transformer secondary and load 22. Varying the operating frequency of a resonant amplifier controls the output energy. The output energy is then typically rectified, stored in a capacitor, then delivered to the load 22. Regulation is provided by feedback which is used to vary the amplifier operating frequency in response to load 22 requirements.

In a typical non-resonant switching amplifier, the switch drive time is varied (PWM) to vary the energy delivered per pulse and the PWM period (or frequency) remains fixed. The output energy is typically rectified, stored in a capacitor, then delivered to the load 22. Regulation may be provided by feedback which is used to vary the switch on time (PWM duty cycle) in response to load 22 requirements. The present invention rectifies but does not filter the output energy. Pulse energy (PWM) is delivered directly to the load 22. The present invention can use both pulse timing and frequency modulation to control energy delivered to the load 22.

Traditional resonant power supplies cannot provide variable energy per pulse. Rather the energy per pulse is fixed requiring fewer pulses per unit time be delivered to reduce output energy and more pulses per unit time to increase energy. This method in effect removes pulses which will cause the flash lamp to extinguish at low energy levels. Traditional PWM controlled power supplies use switch on time duty cycle to control energy and thus offer limited control range.

One embodiment of the present invention comprises the method of varying the pulse width as it would be in a non-resonant amplifier, but in this case, it is applied to MOSFETs. What makes this difficult is the gate capacitance inherent in MOSFETs, which must be overcome in order to control the switching. To vary the duty cycle, the MOSFET gate drive in the present embodiment should have a rise time of 100 nS or less. Furthermore, the gate capacitance of the MOSFETs is additive, which means that as the number of MOSFETs increases, the capacitive loading also increases. The present invention overcomes the gate capacitance with a high speed, current amplifier (Q4 in FIG. 5). The current amplifier provides a large amount of current at a high slew rate to switch the MOSFET quickly. Specialized IC's can also provide high speed MOSFET gate drive.

The present invention, in one embodiment, uses a resonant reset, forward converter power topology, operating in a discontinuous mode. The output of this amplifier 20 is controlled using pulse width modulation (PWM). The amplifier 20 can also be controlled with frequency modulation or a combination of frequency modulation and PWM. The present invention can use this scheme to synthesize any type of current envelope directly to the load 22. When used with a lamp, the present invention relies in part on the persistence of the lamp to do part of the filtering and integration of the output pulses from the amplifier 20 to create a smoothed output. Diodes in known devices do not integrate these pulses. With the present topology, driving the amplifier 20 in this mode is accomplished in part by having the following elements. The drive circuit that drives the MOSFETs 180*80. It includes a drive transformer and a plurality of other switches. The maximum time that the energy is transferred to the load 22 ('ON' time) is determined by the transformer design and switch design such that primary transformer current is interrupted before the transformer core is saturated. The maximum operating frequency is determined by the sum of the 'ON' time and the resonant reset time.

In some embodiments, the physical elements may include a flash lamp or some intermediate device to integrate the PWM output, any type of high speed switch (in this embodiment is the MOSFET 180), and an energy transfer media (MOSFET 180+transformer 182). In one embodiment, the high speed switch section 160 may deliver a plurality of pulses, each with a very small amount of energy to the flash lamp. The transfer medium used in combination can vary the amount of energy by varying energy content in each energy pulse. Because of this variability, this pulse forming network can synthesize any waveform and is not locked into a particular waveform. There is a significant cost reduction using the present invention since hardware does not need to be altered to generate new waveforms and there is substantially greater flexibility in waveforms available. In one embodiment, the energy per pulse is variable at a 200 Khz rate. From pulse to pulse, the present invention can vary the energy. This gives the ability to generate any waveform with a granularity of 100 kHz, or 200 kHz (assuming 2 amps are used at 100 khz), etc. In the present embodiment, the load 22 can be used to integrate the envelope of pulses.

Referring to FIG. 5, a more detailed embodiment of the present invention will now be described. The embodiment of FIG. 5 includes a plurality of MOSFET switches 180. In some embodiments, it is desirable to increase the output from the amplifier 20 to achieve energy levels sufficient for higher intensity uses. One technique for increasing the energy output includes adding more MOSFET switches to the inverter topology as seen in FIG. 5.

Again, in the present embodiment, a portion of a resonant amplifier 20 topology is used. It should be understood that in some embodiments, the present invention may be described as having a resonant reset topology. Specifically, the present invention uses the reset portion of the resonant amplifier 20 and provides a transformer/inductor 182. As seen in FIG. 5, the switch section 160 includes a plurality of MOSFET switches 190, 192, 194, 196, 198, and 200. These switches 190-200 are coupled in a parallel configuration between elements of an input section and the energy transfer device, transformer 182.

When the switch or switches in section 160 are ON, energy is transferred energy through the transformer 182 to the load 22. When the switch section is turned off, the transformer core is reset by imposing a resonant voltage on the primary winding using the magnetizing energy in the transformer core is returned to the front end reservoir section through diode CR4 while resetting the core of transformer 182. It should be noted that, in the embodiment of FIG. 5, there is no current flow through the switches while the switches are transitioning from ON to OFF.

As a nonlimiting example, the design determines that in one embodiment, a switch that can handle 100 amps average and 600 amps peak is desired. This results in a total miller capacitance of 6 nF, so a primary inductance is desired of a small enough amount so the two of those together have a time constant that does not violate the fixed operating frequency desired to keep above the persistence time of the flash lamp. If 100 KHz operation is desired (10 µS period), and 5 µS energy pulse duration is desired, then the maximum allowable rest time is 5 µS. Using the resonance formula $\pi\sqrt{(L_p \cdot C_{Q1})}$ and solving for inductance ($L_p$), the primary inductance in the present embodiment should not exceed 420 uH. Some embodiments may desire to keep above 10 times the persistence time of the flash lamp. The resonant period should fit within the pulse width modulation frequency.

FIG. 5 shows more detail with regards to other elements used in the input section 140, switch section 160, and output section 170. As seen in FIG. 5, the input section 140 contains a scaling amplifier 20, pulse width modulator and output driver. The scaling amplifier 20 amplifies the input signal to adequately drive the pulse width modulator which follows. The pulse width modulator is an oscillator in which the on time can be varied in response to the input signal. The pulse width modulator produces a fixed frequency square wave of which the on time is varied proportionately to the input signal. The output driver provides current amplification adequate to provide drive to the switch section.

The switch section 160 (described in detail in the previous paragraphs) provides energy transfer to the load 22 and ensures electrical isolation from the load 22.

The output section consists of the transformer secondary, isolation diodes and balancing resistors. The output section couples the energy to the load 22 and together with the switch section, provides impedance matching with the load 22. The transformer provides the coupling of energy from the switch section to the output and also provides the electrical isolation from the switch section and load 22. The isolation diodes prevent reversed current flow to the load 22 during the transformer core reset period. The isolation diodes also prevent current flow from one module to another module when multiple modules are connected to one load 22. The transformer and diode isolation makes it possible to connect multiple modules to one load 22.

The control section consists of logic circuitry which can supervise the operation of the overall amplifier 20. The control section can monitor load 22 current and limit the PWM duty cycle to a preset maximum value. The control section can also provide an arbitrary signal to the input scaling amplifier 20 to drive the load 22 with a synthesized arbitrary waveform. The control section can also vary the PWM frequency for low power applications.

The present invention can withstand a load 22 of varying amount. The feature that allows the amplifier 20 to withstand the negative impedance is that the sensitive element (the switch) is not involved directly in the transfer of energy into the load 22. Zero current switching is desirable. The energy is transferred by the transformer. So, it is transferred magnetically. Then the switch is turned off and the switch has a period time for it to turn off. The period of time is determined by its miller capacitance and the inductance of the transformer. No energy is transferred during the switching.

Thus as seen in FIG. 5, some embodiments of the present invention may be viewed as having a switch section, an output section having a transformer, isolation circuitry, and snubber circuitry. The present invention may include rectifiers (diodes) so that energy only goes to the load 22. The persistence of the load 22 may be a design constraint that will influence the selection of these elements. It should be understood that in some embodiments, the lower the amplifier 20 output impedance, the better. The ability to drive in parallel and series is desirable in some embodiments.

Figure 6:
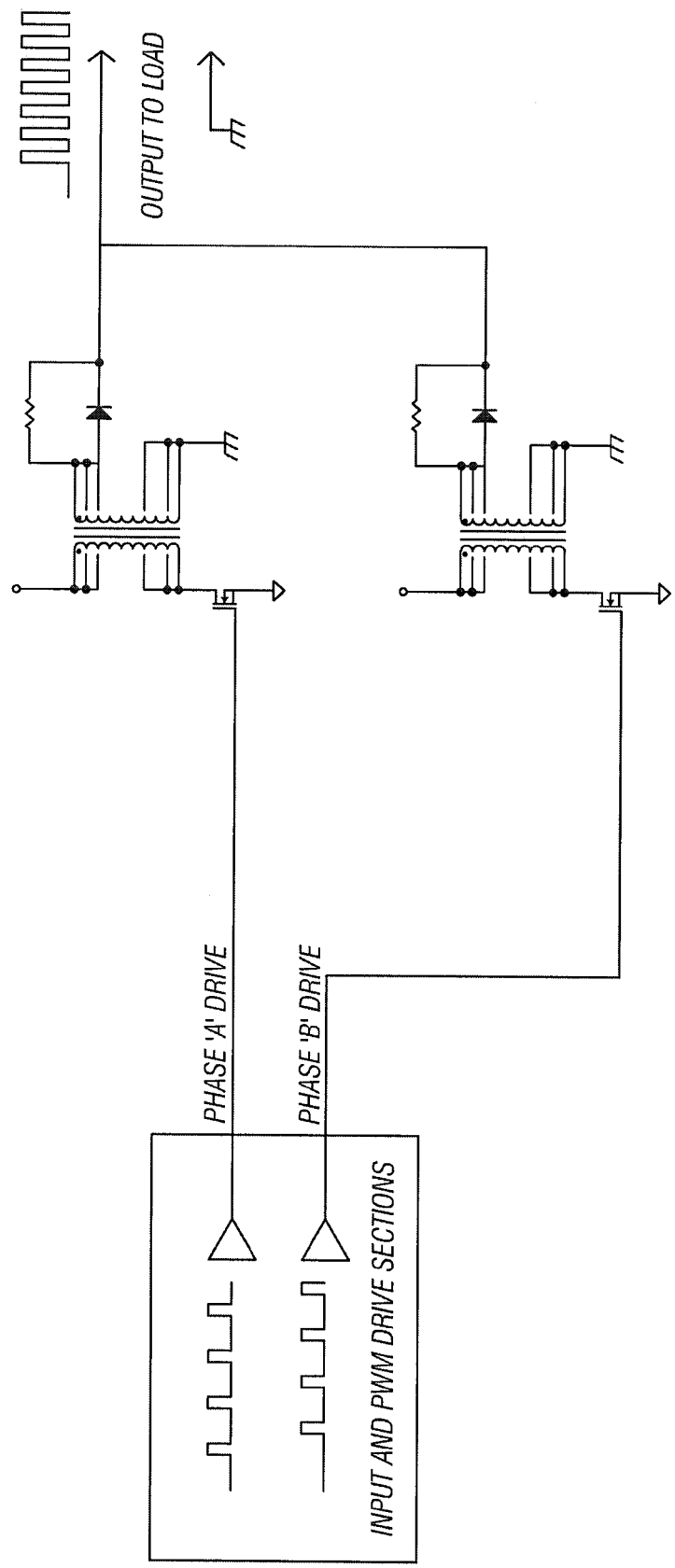
FIG. 6 shows an embodiment of the present invention where the outputs of two amplifiers are coupled together for a series drive configuration.

Referring now to FIG. 6, a schematic showing an amplifier 20 using a single inverter section is shown. As seen, input and PWM drive sections provide the inverter section (having the switch section and the output section) to provide a pulsed output directly to the load 22.

Figure 7:
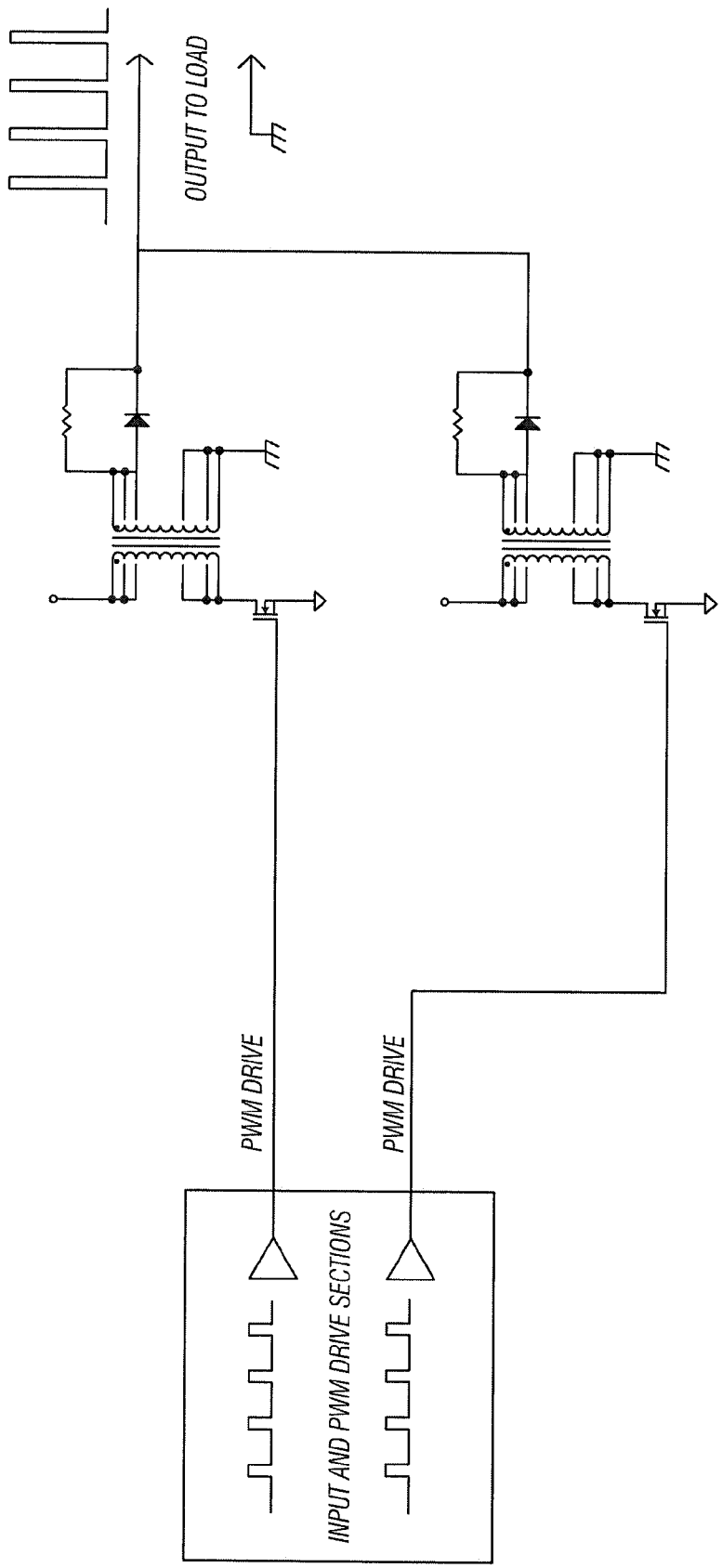
FIG. 7 shows an embodiment of the present invention where the outputs of two amplifiers are coupled together for a parallel drive configuration.

Referring now to the embodiment of FIG. 7, it should be understood that a parallel configuration may be used, having two inverter sections. This decreases the output impedance of the amplifier 20. This will increase the amplitude of the output pulse to a dynamic load 22 such as but not limited to a flash lamp. The output section provides the isolation and allowing for connection of parallel switch sections. Transformers and switches may be added in the manner to improve performance.

Figure 8:
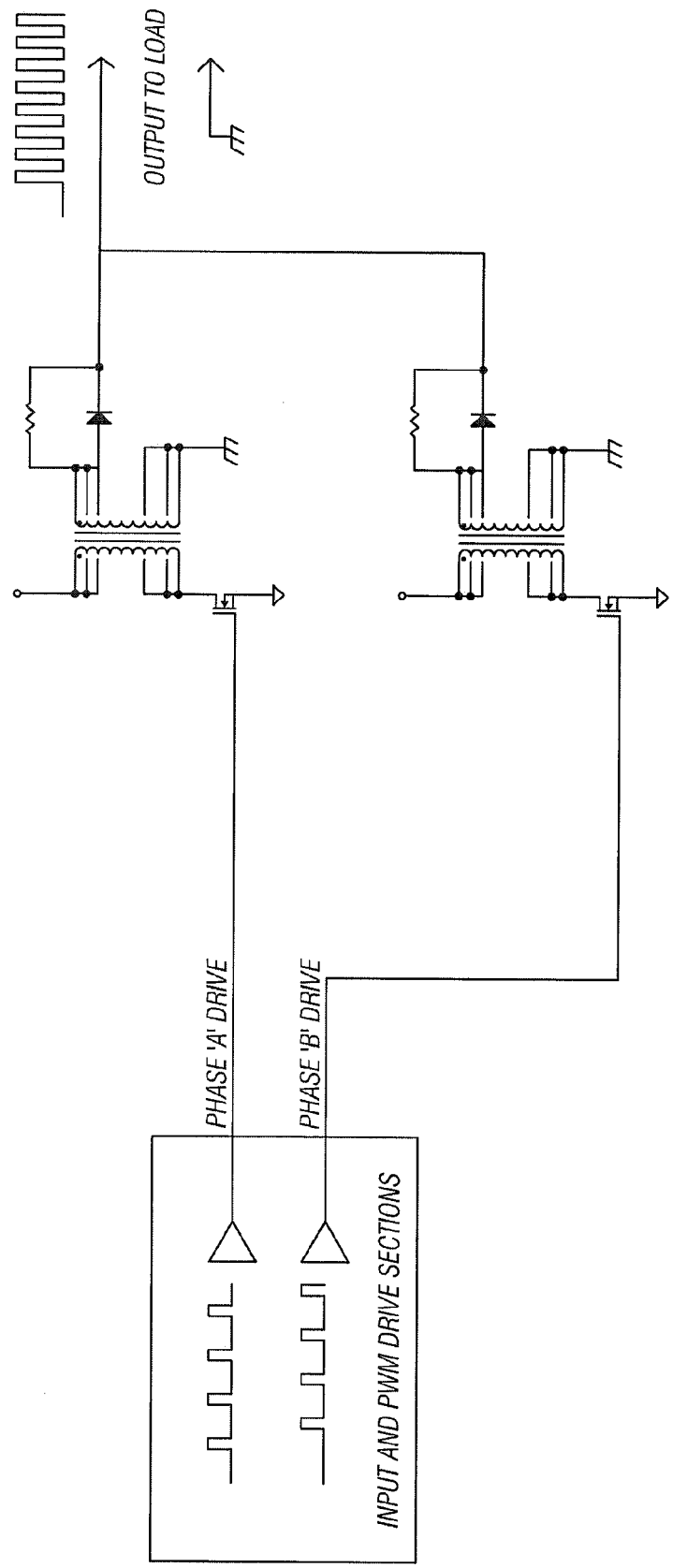
FIG. 8 shows an embodiment of the present invention where the outputs of two amplifiers are coupled together.

Referring now to the embodiment of FIG. 8, a still further variation shows that two inverter sections may be connected in parallel but driven in series. As seen, the input from the input and drive sections are out of phase. Specifically, they are driven out of phase by 180 degrees. This results in the delivery of pulses to the lamp or load 22 twice as often, effectively doubling the power delivered to the load 22. In the present embodiment, about 80 kHz-100 kHz is a design range for the frequency of the amplifier 20. Such circuit has a resonant reset period of about 5 microseconds. There is only a certain amount time that energy can be stored in the device before the magnetic flux density is depleted and the storage saturates. 5 microseconds is the time before the device is turned off and allowed to reset. Thus, for this particular embodiment, one cannot put as much into this transformer core at this operating frequency. If the frequency is decreased, one can store more energy per pulse, deliver more to the load 22. This brought about the series configuration as described in FIG. 8. In one nonlimiting example, the power supplies may operate at 70 khz, but the lamp will receive twice as many pulses (140 khz drive) since there are two amplifiers 20 supplying pulses out of phase.

Figure 9:
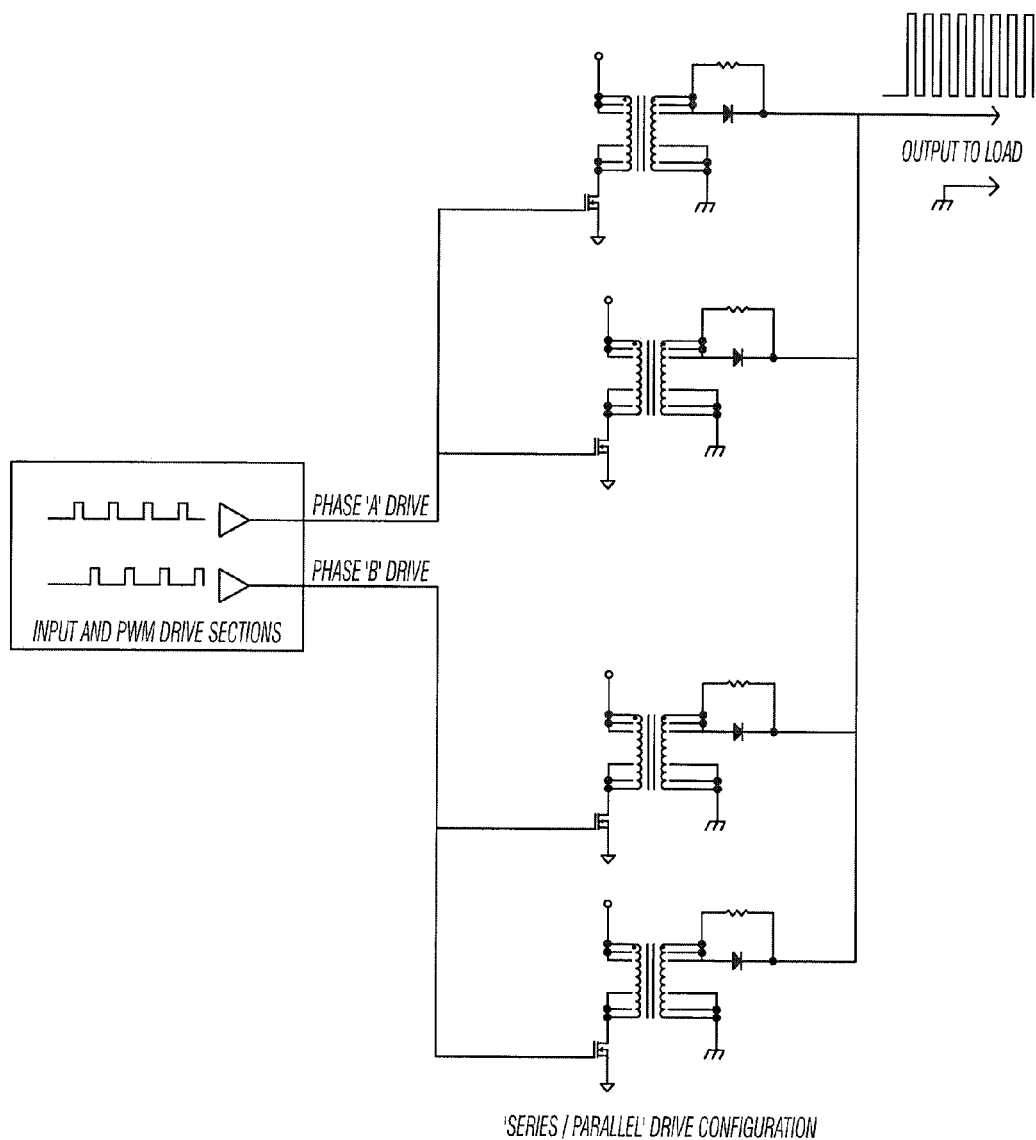
FIG. 9 shows an embodiment of the present invention where the outputs of two amplifiers are coupled together for series/parallel drive configuration.

FIG. 9 shows a combination of amplifiers 20 coupled together in a series and parallel drive configuration. It should be understood that these changes in driving the amplifiers 20 does not change the physical or actual connection to the lamp. Most of these changes occur in software.

Figure 10:
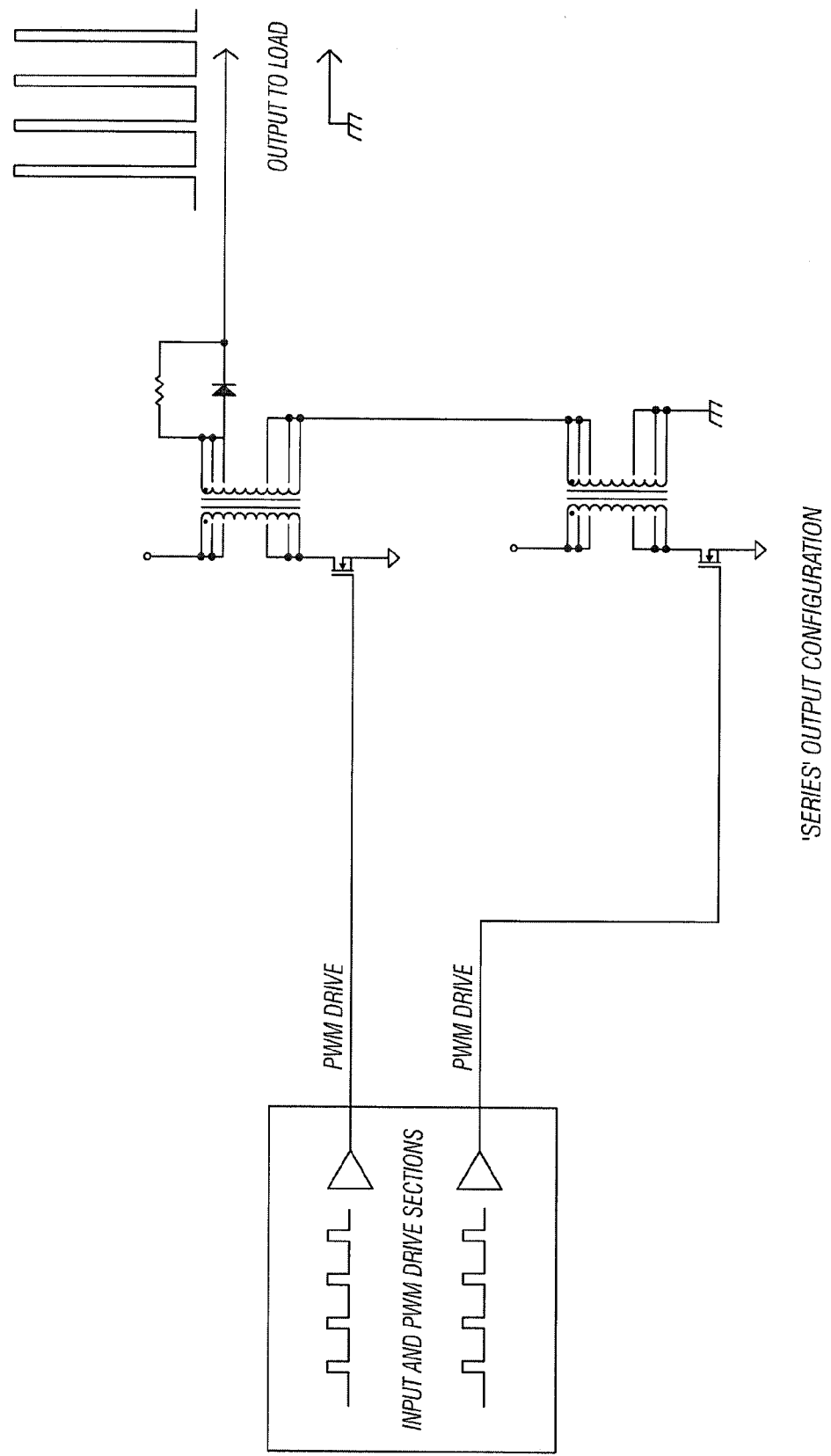
FIG. 10 shows an embodiment of the present invention where the outputs of two amplifiers are coupled together for in-phase, series drive configuration.

Referring now to the embodiment of FIG. 10, a still further variation shows that the outputs of two inverter sections may be connected in series but driven in parallel. This increases the output voltage delivered to the load 22.

The power supplies of the present invention may be advantageously used in a variety of applications. As a nonlimiting example, the embodiments of the present invention may be used to address the issue of thermal lensing that occurs in laser systems. Thermal lensing is undesirable as it changes the operating parameters of the laser. Although not limited to the following, the present example uses a YAG laser operating at 10 hz. The present method involves maintaining a constant thermal load on the gain medium over a period of time. Thus, even though the rep rate of the laser may vary, the amount of energy delivered to the rod or gain medium is the same over a period of time. In this way, thermal lensing does not change since the thermal load does not change.

Figure 11:
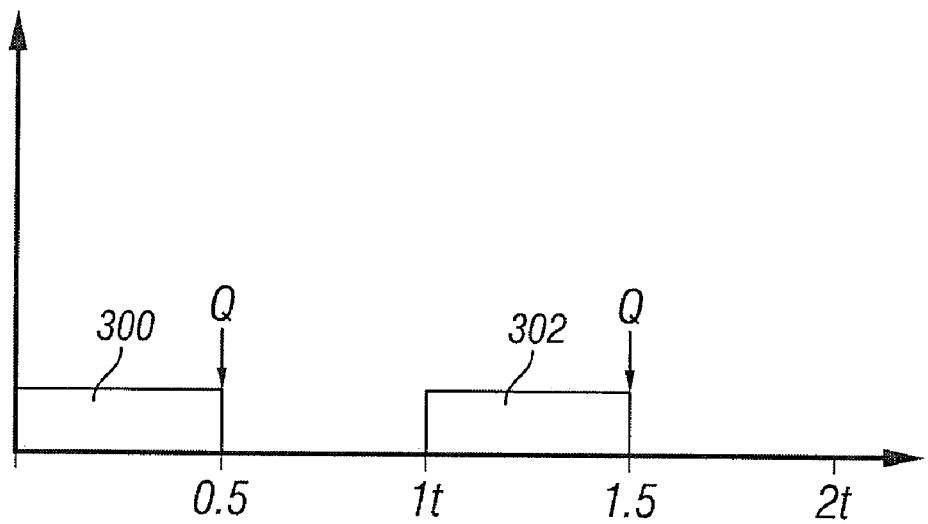
FIGS. 11-14 are graphs illustrating certain embodiments of laser systems of the present invention.
Figure 12:
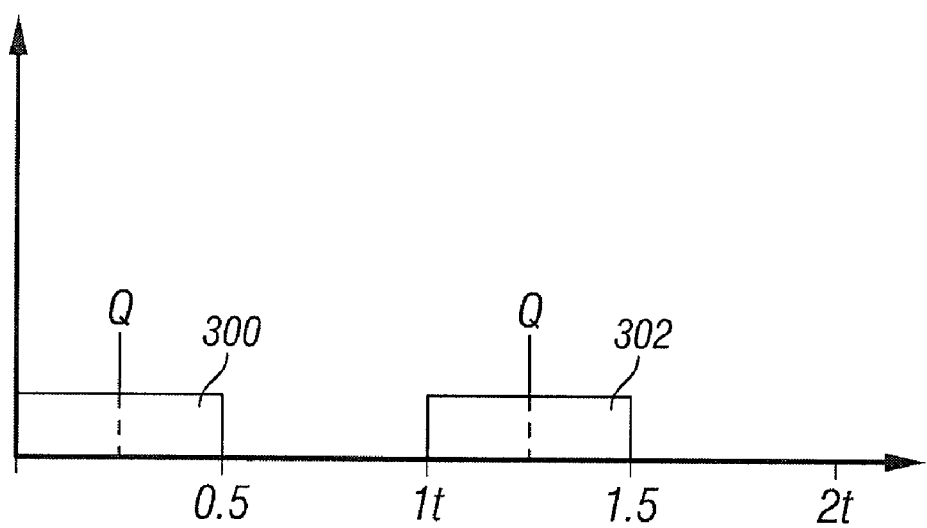
Figure 13:
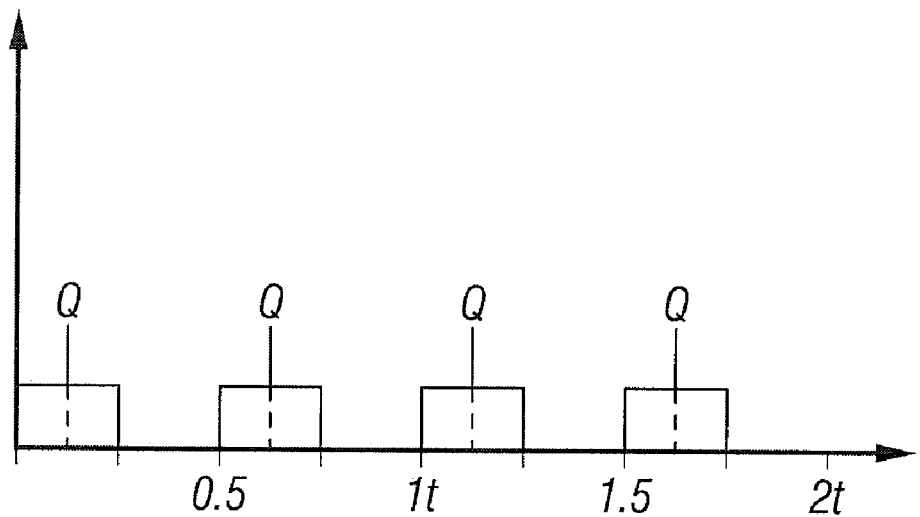

Referring now to FIGS. 11-13, in one embodiment of the present invention, this may involve extending pulse duration to maintain constant thermal loading. The pump conditions may be adjusted so that the amount of energy delivered to the gain medium over a period time of X is always constant. In FIG. 11, the period of is 2 t. The pulses are adjusted and Q-switched to achieve the desired energy output and rep rate. Because the pulse width is variable, it can be adjusted with the rep rate to maintain the same thermal load on the gain medium. The present invention provides a thermal load of N per pulse and the loading would be N divided by frequency per pulse. FIG. 11 shows that energy is provided to the gain medium over a period of time from 0 to 0.5 t and 1 t to 1.5 t. The laser is Q-switched at the end of each pulse. In FIG. 12, the same amount of energy is delivered to the gain medium as indicated by pulses 300 and 302. The Q-switch may be varied to change the rep rate and/or energy from the laser, but the thermal load on the gain medium remains the same over the same period of time as that in FIG. 11. FIG. 13 shows that the rep rate is increased, but again, the total amount of energy seen by the gain medium is the same and the thermal loading over the time 2 t in FIG. 13 is the same as the thermal loading in FIG. 11.

The constant thermal load may be accomplished, in one embodiment, by Q-switching the laser to deliver the laser light but still allowing energy to heat the rod after the Q-switch. After the buildup, the Q-switch is fired. In one example, the laser fires at 10 hz, so if 25 joules are put into the laser 10 times a second (250 watts), about 2.5 watts come out as laser light (e.g. about 1% comes out). The remainder goes to heat the YAG laser rod. The problem with all YAG lasers is that they are fixed point operating systems. With more heat, the lense gets sharper, with less heat the lense is less sharp. The thermal lense is a function of rep rate and corrective optic. Different laser rods have different thermal lenses.

Figure 14:
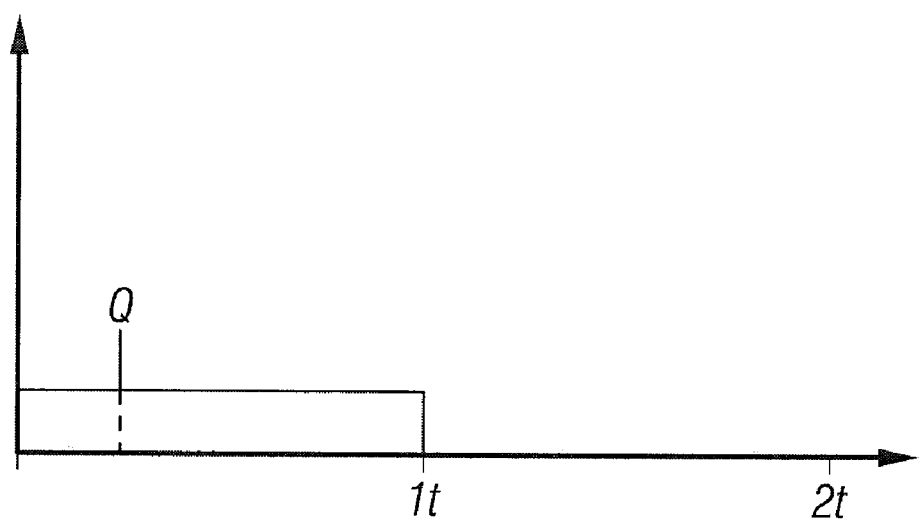

With the present invention, the amplifier 20 can maintain constant thermal loading or constant watts. As a nonlimiting example, if the laser operates at 50 hz (200 ms), 1250 watts are put into the laser per second. This creates a very sharp lense since there is substantial heating in the rod. Typically, changing the frequency of the laser will change the thermal load on the laser and result in a different thermal lensing to correct for. The present invention may be used to maintain a constant thermal lens, even when the laser operates at varying rep rate. The amplifier 20 may vary its output to maintain the constant thermal load, while also adjusting for varying rep rates for the laser. The laser may be Q-switched to deliver the laser energy at a desired frequency. However, the remainder of the time, the amplifier 20 will be used to deliver energy to the rod to keep the rod warm. Thus in the present example, if the laser operates at 12 hz, the YAG rod still sees 1250 watts. The Q switch may occur every 12th pulse, but again the heat load on the laser rod remains the same since the same amount of energy is still delivered to the laser rod. The Q switching is varied. FIG. 14 shows another embodiment where the Q-switch occurs at a lower rep rate. Again, the thermal load over the period 2 t is the same in FIG. 11 and in FIG. 14.

While the invention has been described and illustrated with reference to certain particular embodiments thereof, those skilled in the art will appreciate that various adaptations, changes, modifications, substitutions, deletions, or additions of procedures and protocols may be made without departing from the spirit and scope of the invention. For example, with any of the above embodiments, a variety of protection elements may be included in the circuit design to minimize heating of the elements. In some embodiments, the present invention may be viewed as having two elements (switch+ transformer) with a certain result in a resonant topology. Embodiments of the present invention may use gapped or ungapped transformers. It should be understood that some embodiments may have output energy is typically rectified, stored in a capacitor, then delivered to the load 22. For other applications using any of the embodiments described herein, other light sources can be powered. Incandescent, fluorescent lamps, diodes, LEDS, metal vapor lamps, and other light sources can be powered by the amplifier 20 according to the present invention.

The publications discussed or cited herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed. All publications mentioned herein are incorporated herein by reference to disclose and describe the structures and/or methods in connection with which the publications are cited. The present application is a continuation in part of U.S. Ser. No. 11/053,194 filed Feb. 7, 2005, and is a continuation-in-part of U.S. Ser. No. 11/053,195, filed Feb. 7, 2005, both of which applications claim the benefit of priority from commonly assigned co-pending U.S. Provisional Application Ser. No. 60/569,207 filed May 6, 2004. All of the above-identified applications are fully incorporated herein by reference for all purposes.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

While the above is a description of the certain embodiments of the invention, various alternatives, substitutions and modifications may be made without departing from the scope thereof, which is defined by the following claims. Thus, the preferred embodiments should not be taken as limiting the scope of the invention. Furthermore, the present invention is directed to a number of separate inventions and each of these inventions may be claimed independently of one another. Each feature, aspect and advantage of the invention may be claimed independent of one another without departing from the scope of the invention. Thus, the invention does not include a single essential feature, aspect or advantage and the invention should not be limited as such. It is intended, therefore, that the invention be defined by the scope of the claims which follow and that such claims be interpreted as broadly as is reasonable.

What is claimed is:

1. A power supply system of a pulse forming network that includes an amplifier, comprising:
   a power supply;
   at least one energy storage capacitor bank;
   a voltage monitor coupled to the power supply and the energy storage capacitor bank;
   a feedback control coupled to the power supply, the feedback control configured to provide a measurement of an amount of energy that is delivered to the pulse forming network; and
   in response to the measurement, the feedback control going to a high resolution mode where it maintains an amount of energy stored in the pulse forming network to compensate for internal losses within the pulse forming network that occur through component imperfections, the feedback control configured to provide that a current applied to the energy storage capacitor bank is substantially the same as current leaking out of the power supply.

2. The system of claim 1, wherein the feedback control includes control logic.

3. The system of claim 1, wherein the feedback control includes a precision control device.

4. The system of claim 1, wherein the output of the power supply is rectified and used to charge the at least one energy storage capacitor bank.

5. The system of claim 1, wherein the system is a low repetition rate system.

6. The system of claim 1, further comprising:
   an amplifier driver that drives the amplifier in a discontinuous mode, and during a non-energy transfer portion, the output of the amplifier is electrically isolated from the load, wherein the electrical isolation allow for coupling multiple amplifier outputs together, the amplifier driver including logic for driving the amplifiers in a manner selected from at least one of: 1) increasing power by interleaving the drive of multiple amplifier modules or 2) lowering the impedance by simultaneously driving the connected amplifier modules.

7. The system of claim 1, wherein the amplifier includes a number of switches that influence an absolute reset time for the amplifier, and the number of switches is selected so as not to cause the reset time of the amplifier to exceed ¹⁄₁₀th of the persistence time of the lamp.

8. The system of claim 1, wherein an output voltage is selected so that wavelength output from the dynamic load is substantially in the infrared wavelengths.

9. The system of claim 1, wherein an energy output of the amplifier is proportional to an analog input, the energy output having a plurality of pulses, the amplifier having an output recovery time sufficiently fast to enable another pulse to be delivered to the load prior to exceeding a persistence time of the load.

10. The system of claim 1, wherein the amplifier has a topology that provides during a non-energy transfer portion that an impedance is at a level such that an amplifier output current is limited from the amplifier and a peak current of a switch in the amplifier does not exceed a peak current rating of the switch.

11. The system of claim 1, wherein the amplifier has a topology that provides during a non-energy transfer portion, an output of the amplifier is electrically isolated from the load.

12. The system of claim 1, wherein the PWM power output is directly to the non-linear load, and the amplifier has a topology configured to provide during a non-energy transfer portion an impedance greater than 10000 times a minimum, dynamic impedance of the non-linear load.

13. The system of claim 1, further comprising:
   an amplifier driver to drive the amplifier in a discontinuous mode; and
   wherein the amplifier has a topology to provide that an output of the amplifier is electrically isolated from the non-linear load during a negative impedance state and tolerates a negative impedance of the load.

14. The system of claim 1, further comprising:
   an amplifier driver to drive the amplifier in a discontinuous mode, and during a non-energy transfer portion an output of the amplifier is electrically isolated from the load, the electrical isolation providing for coupling multiple amplifier outputs together, the amplifier driver having logic for driving the amplifiers in a manner selected from at least one of: 1) increasing power by interleaving the drive of multiple amplifier modules or 2) lowering the impedance by simultaneously driving the connected amplifier modules;
   an amplifier providing a PWM power output to the non-linear load, the amplifier comprising a plurality of amplifier modules each providing a power output.

15. A power supply system, comprising:
   a power supply;
   at least one energy storage capacitor bank;
   a voltage monitor coupled to the power supply and the energy storage capacitor bank;
   a feedback control coupled to the power supply, the feedback control and precision control device configured to provide that a current applied to the at least one energy storage capacitor bank is substantially the same as current leaking out of the power supply;
   a dynamic load having a dynamic load impedance;
   an amplifier that has as part of the amplifier a resonant reset topology, the amplifier being configured to vary a duty cycle in response to a signal resented to an input; and
   wherein the amplifier has an output impedance that is less than the dynamic load impedance of the dynamic load when the dynamic load is in a confined discharge mode.

16. The system of claim 1, wherein the amplifier has a topology that provides for, during a non-energy transfer portion, an impedance at a level such that the amplifier output current is limited from the amplifier such that the peak current of a switch in the amplifier does not exceed the peak current rating of the switch.

17. The system of claim 1, wherein the amplifier has a topology configured to provide that during a non-energy transfer portion an output of the amplifier is electrically isolated from the load.

18. The system of claim 1, wherein the amplifier has a topology configured to provide that an output of the amplifier is electrically isolated from the dynamic load during a negative impedance state and tolerates a negative impedance of the load.

19. A power supply system of a pulse forming network that includes an amplifier, comprising:
a power supply;
at least one energy storage capacitor bank;
a voltage monitor coupled to the power supply, and the energy storage capacitor bank;
a feedback control coupled to the power supply, the feedback control and configured to provide that a current applied to the at least one energy storage capacitor bank is substantially the same as the current leaking out of the power supply;
wherein the amplifier includes a number of switches that influences an output impedance of the amplifier, and the number of switches is selected so that the impedance is less than or equal to the dynamic load impedance the amplifier having a resonant reset topology.

20. The system of claim 19, wherein the switches are MOSFET switches.

21. A power supply system of a pulse forming network that includes an amplifier, comprising:
a power supply;
at least one energy storage capacitor bank;
a voltage monitor coupled to the power supply and the energy storage capacitor bank;
a feedback control coupled to the power supply the feedback control and configured to provide that a current applied to the at least one energy storage capacitor bank is substantially the same as the current leaking out of the power supply;
wherein the amplifier includes a transformer with magnetic characteristics that influence an absolute reset time of the amplifier, the magnetic characteristics being selected to provide that a reset time is less than or equal to a desired percentage of a persistence time of the dynamic load.

22. A power supply system of a pulse forming network that includes an amplifier, comprising:
a power supply;
at least one energy storage capacitor bank;
a voltage monitor coupled to the power supply and the energy storage capacitor bank;
a feedback control coupled to the power supply, the feedback control and configured to provide that a current applied to the at least one energy storage capacitor bank is substantially the same as the current leaking out of the power supply;
wherein the amplifier includes a transformer made of a core material that influences an absolute reset time of the amplifier, the core material being selected to provide that an absolute reset time of the amplifier is less than or equal to a desired percentage of a persistence time of the dynamic load.

23. A power supply system of a pulse forming network that includes an amplifier, comprising:
a power supply;
at least one energy storage capacitor bank;
a voltage monitor coupled to the power supply and the energy storage capacitor bank;
a feedback control coupled to the power supply, the feedback control and configured to provide that a current applied to the at least one energy storage capacitor bank is substantially the same as the current leaking out of the power supply;
wherein the amplifier has a resonant reset, forward converter topology, and includes a transformer with windings that provide a certain number of gauss, and the number of windings affects the rise time of the transformer, wherein a rise time is selected so that such that an absolute reset time of amplifier is less than or equal to a desired percentage of a persistence time of the dynamic load or saturation time.

24. A power supply system, comprising:
a power supply;
at least one energy storage capacitor bank;
a voltage monitor coupled to the power supply and the energy storage capacitor bank;
a feedback control that includes control logic; and
a precision control device coupled to the feedback control and the power supply, the feedback control and precision control device configured to provide that a current applied to the at least one energy storage capacitor bank is substantially the same as current leaking out of the power supply;
a dynamic load having a dynamic load impedance;
an amplifier having a resonant reset topology configured to provide a PWM power output to the dynamic load, wherein the amplifier has an output impedance that is less than the impedance of the load when the load is in a confined discharge mode;
a flash lamp having a flash lamp impedance and an arc persistence time when the flash lamp is lit, the amplifier having a topology for providing PWM power output directly to the flash lamp; and
an amplifier driver configured to drive the amplifier, the amplifier driver having a fixed or variable frequency control that provides the PWM power output at a frequency such that the period of the power output does not exceed the persistence time of a flash lamp during energy delivery.

25. The system of claim 24 wherein the amplifier driver is configured to drive the amplifier to provide a PWM output at a frequency of no slower than $1/10$th of a persistence time of a flash lamp.

26. The system of claim 24, wherein the amplifier driver is configured to drive the amplifier to provide a PWM output at a frequency of no slower than a desired percentage of a persistence time of a flash lamp, the frequency selected so that an optical output of the flash lamp has less than 10% ripple.

27. The system of claim 24, wherein the amplifier has an output impedance that is less than the impedance of the lamp when the lamp is in a confined discharge mode.

28. The system of claim 24, wherein, an output impedance of the amplifier is less than $1/10$ of the impedance of the lamp when the lamp is in a confined discharge mode.

29. The system of claim 24, wherein an output impedance of the amplifier is less than $1/50$ of the impedance of the lamp in a confined discharge mode.

30. The system of claim 24, wherein the amplifier has a topology to provide that during a non-energy transfer portion, the impedance is at a level such that an amplifier output current is limited from the amplifier such that the peak current of a witch in the amplifier does not exceed the peak current rating of the switch.

31. The system of claim 24, wherein the amplifier has a topology that provides during a non-energy transfer portion, the output of the amplifier is electrically isolated from the load.

32. The system of claim 24, wherein the amplifier has a topology the provides during a non-energy transfer portion, the amplifier has an impedance greater than 10000 times a minimum, dynamic impedance of the flash lamp.

33. The system of claim 24, wherein the amplifier has a topology o provide that the output of the amplifier is electrically isolated from the flash lamp during a negative impedance state and tolerates a negative impedance of the load.

34. The system of claim 24, wherein the amplifier has a plurality of amplifier modules each providing a power output, and the amplifier driver provides for driving the amplifier in a discontinuous mode, and during a non-energy transfer portion, the output of the amplifier is electrically isolated from the load, wherein the electrical isolation allow for coupling multiple amplifier outputs together, the amplifier driver including logic for driving the amplifiers in a manner selected from at least one of: 1) increasing power by interleaving the drive of multiple amplifier modules or 2) lowering the impedance by simultaneously driving the connected amplifier modules.

35. The system of claim 24, wherein the amplifier includes a number of switches that influences an output impedance of the amplifier, and the number of switches is selected so that the impedance is less than or equal to the flash lamp impedance.

36. The system of claim 35, wherein the switches are MOSFET switches.

37. The system of claim 24, wherein the number of switches is selected so as not to cause the reset time of the amplifier to exceed ⅟₁₀th of the persistence time of the lamp.

38. The system of claim 24, wherein the amplifier has a transformer with magnetic characteristics that influence an absolute reset time of the amplifier, and the magnetic characteristics are selected so that the reset time is less than or equal to a desired percent of a persistence time of the flash lamp.

39. The system of claim 24, wherein the amplifier has a transformer made of a core material which influences an absolute reset time of the amplifier, the core material selected so that such that the absolute reset time of amplifier is less than or equal to a desired percentage of a persistence time of the flash lamp.

40. The system of claim 24, wherein the amplifier has a transformer and windings that provide a certain number of gauss and the number of windings affects the rise time of the transformer, and the rise time is selected so that such that the absolute reset time of amplifier is less than or equal to a desired percentage of a persistence time of the flash lamp or saturation time.

41. The system of claim 24, wherein the amplifier has a resonant reset, forward converter topology, and an output voltage is selected so that wavelength output from the flash lamp is substantially in the infrared wavelengths.

42. The system of claim 24, wherein energy output of the amplifier is proportional to the analog input, the energy output comprising a plurality of pulses, the amplifier having an output recovery time sufficiently fast to enable another pulse to be delivered to the load prior to exceeding a persistence time of the load.

43. The system of claim 24, wherein the amplifier hays a topology wherein during a non-energy transfer portion, the impedance is at a level such that the amplifier output current is limited from the amplifier such that the peak current of a switch in the amplifier does not exceed the peak current rating of the switch.

44. The system of claim 24, wherein the amplifier has a topology that provides during a non-energy transfer portion, the output of the amplifier is electrically isolated from the load.

45. The system of claim 24, wherein the amplifier has a topology configured to provide that during a non-energy transfer portion, the amplifier has an impedance greater than 10000 times a minimum, dynamic impedance of the non-linear load.

46. The system of claim 24, wherein the amplifier driver drives the amplifier in a discontinuous mode, and the amplifier has a topology that provides for an output of the amplifier to be electrically isolated from a non-linear load during a negative impedance state and tolerates a negative impedance of the load.

47. The system of claim 24, wherein the amplifier driver drives the amplifier in a discontinuous mode, and during a non-energy transfer portion, the output of the amplifier is electrically isolated from the load, the electrical isolation allowing for coupling multiple amplifier outputs together, the amplifier driver including logic for driving the amplifiers in a manner selected from at least one of: 1) increasing power by interleaving the drive of multiple amplifier modules or 2) lowering the impedance by simultaneously driving the connected amplifier module.

* * * * *